P. A. E. ARMSTRONG.
IMMERSION WATER HEATER.
APPLICATION FILED APR. 19, 1921.
1,437,481.
Patented Dec. 5, 1922.
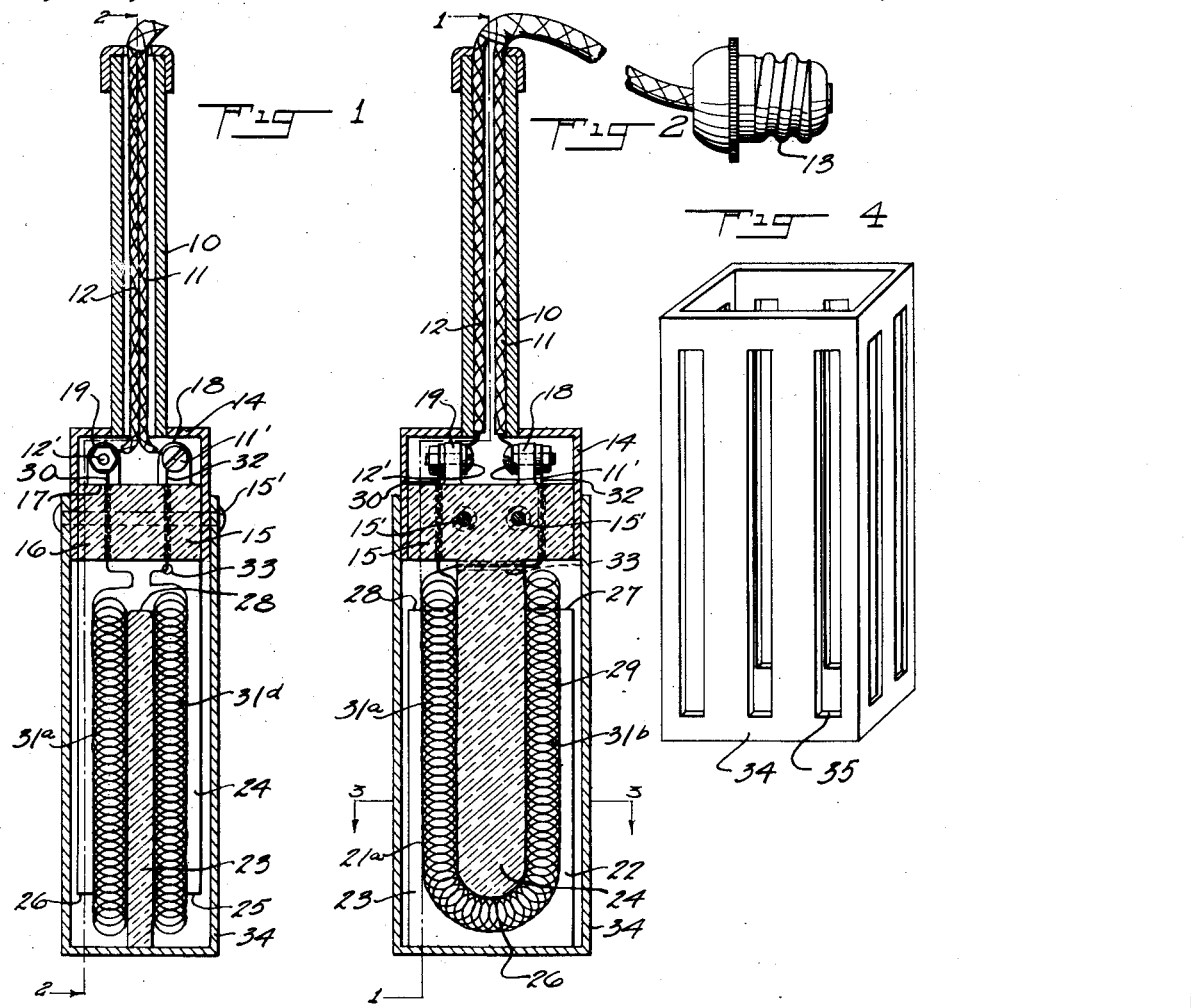
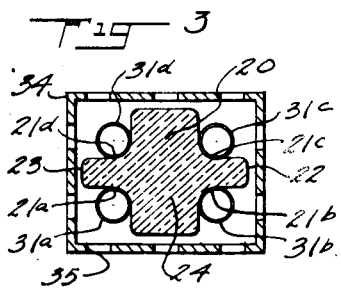

Patented Dec. 5, 1922.

1,437,481

UNITED STATES PATENT OFFICE.

PERCY A. E. ARMSTRONG, OF LOUDONVILLE, NEW YORK.

IMMERSION WATER HEATER.

Application filed April 19, 1921. Serial No. 462,665.

*To all whom it may concern:*

Be it known that I, PERCY A. E. ARMSTRONG, a subject of the King of Great Britain, and a resident of Loudonville, county of Albany, and State of New York, have invented a new and useful Improvement in Immersion Water Heaters, of which the following is a specification.

My invention relates to an electrical heater for water or other fluids, adapted to heat the water, etc., by being immersed in an open vessel containing the same and constitutes an improvement over the inventions disclosed in my copending applications filed April 16, 1921 and April 19, 1921, and bearing Serial Numbers 461,909 and 462,664 respectively.

According to the present invention, a bare electrical heating element or elements are provided, which are brought into direct contact with the water, and these elements are made from non-rusting material such, for example, as "sicro" which may be of approximately the following analysis: iron 75%, chromium 20%, silicon 2%, cobalt 2% and carbon 3%, with small proportions of manganese and impurities, such as sulfur, etc. The percentages may, of course, vary somewhat from these figures and I may, for example, make use of other alloys containing iron and chromium, so long as the material has satisfactory heating element qualities, and is non-rusting or practically so.

Such electrical heating element or elements are so arranged within a suitable holder, that while they are not exposed on the outer surface of the heater, so that the hand of the user, for example, may come into contact therewith with resulting shock or burn, it is nevertheless readily possible for the water or other liquid to come into direct contact with the bare heating elements, and provision is made for ready circulation of the fluid so that it may be rapidly and effectively heated.

In the drawings forming a part of this specification I have shown an embodiment of the invention for the purpose of illustration and for affording an understanding of the invention, and not for limitation of the invention.

In said drawing, Fig. 1 is a longitudinal sectional view of a heating device taken on the line 1—1, Fig. 2. Fig. 2 is a sectional view taken on the line 2—2, Fig. 1. Fig. 3 is a transverse sectional view taken on line 3—3, Fig. 2, and Fig. 4 is a perspective view of the open work sheath or covering for the heating elements.

The handle 10 is hollow and receives the wires 11, 12 which extend out from the end of the handle and connect with a socket plug 13. To the handle is secured the hollow head 14 which receives the core 15 of insulating material, preferably porcelain, said core being secured in place by screws, bolts or the like 15'.

Core 16, in the form shown, comprises the head 17 provided with lugs 18, 19 for receiving and locating the binding screws 11', 12'. It also comprises a standard 20 of somewhat irregular shape integral with head 17. Standard 20 is cut away at the corners, as shown at $21^a$, $21^b$, $21^c$ and $21^d$ in Fig. 3, leaving two wings 22, 23 extending laterally from the central portion 24. Central part 24 is cut away at the lower end on each side, as shown at 25, 26, and wings 22, 23 are cut away at their upper ends at 27, 28. Standard 20 may, therefore, be described as of generally cruciform cross-section, with the members which may be referred to as crossing one another of about the same length but longitudinally displaced with respect to one another so that transverse cut away portions are presented above the one and below the other.

The core so made up is well adapted for arrangement thereon of the resistance element or elements 29, which is preferably of "sicro" or other non-rusting wire coiled into a flexible cylindrical coil. The connections may be variously made, as series, parallel, etc., but in the form shown, one continuous coil is made use of. One end 30 is connected to binding post 12', and part $31^a$ of the element is carried down the cut out corner portion $21^a$ of the core thence across through cut-out 26, and portion $31^b$ extends upwardly lying in the angular recess $21^b$. Thence the element extends through the upper cut-out 27 of wing 22 and then downwardly with the portion $31^c$ lying in corner recess $21^c$, thence across through cut-out 25, under core section 24, and finally part $31^d$ extends upwardly through corner recess $21^d$ and the end 32 of the wire is passed through the opening 33 in the core and connected to binding post 11'.

A sheath or cover is provided in order to enclose the heating element to a sufficient extent to prevent its coming into contact with outside objects and at the same time to permit circulation of the water and direct contact thereof with the bare heating element. In the form shown, sheath 34 is of substantially box-like form adapted to fit over and be secured to head 14 by means of the screws or the like 15', and provided with a plurality of openings 35 which in the form shown are in the form of elongated vertical slots extending practically the entire length of the sheath or cover 34.

It has been found that alloys such as described make good electrical heating elements and at the same time are substantially non-rusting under the trying conditions presented which include, in addition to the requirements for ordinary electrical heating elements that same shall stand up in use where used occasionally in the bare state partly or wholly submerged in water, and that same shall be non-rusting when exposed to the atmosphere for long periods with the exposed surfaces of the elements in varying conditions as regards moisture, as same are at times quite wet, at other times merely moist, and at other times dry.

It will be seen that heat is rapidly and efficiently supplied to the water coming into direct contact with the bare resistance coils, and that any current leakage does not result in loss of efficiency, since heat is produced, for example, by passage of current through the water from one zone or convolution of the heating element or elements to an adjacent zone or convolution thereof.

I claim:

1. In an electrical water heater adapted to heat water by being immersed therein in an open vessel, a bare, rustless electrical heating element adapted to withstand high temperatures and of approximately the following analysis: chromium 20%, silicon 2%, cobalt 2% and carbon under .5%, and the principal part of the remainder iron.

2. In an immersion water heater, a core of insulating material such as porcelain, said core being of generally cruciform cross-section with the crossing parts longitudinally displaced with respect to one another, and coiled, bare, rustless electrical heating elements disposed about said core in a plurality of loops and adapted to be exposed directly to the water to be heated.

3. In an immersion water heater, a core of insulating material such as porcelain, bare, rustless electrical heating elements disposed about said core, and a perforated sheath or cover about said core and elements, whereby the water may circulate freely in direct contact with the heating elements and at the same time they are protected from contact with external objects.

4. In an immersion water heater, a core or base of insulating material such as porcelain, a bare, rustless electrical heating element disposed about such core or base, and a casing for containing the core and element, spaced away therefrom, and provided with a plurality of elongated slots in the sides thereof.

5. In an immersion water heater, a bare convoluted non-rusting electrical heating element having zones or convolutions adjacent to one another and adapted to be immersed in water and in direct contact therewith whereby the water is heated from the hot element and also by current passing through the water from one zone or convolution of the heating element to another zone or convolution thereof.

6. In an immersion water heater, a core comprising a head and a depending portion of reduced section as compared with the head, a bare, rustless electrical heating element disposed about the depending portion of the core, and a two-part casing for the device, the head of the core being secured within one casing portion and the other casing portion being perforated and secured upon the first named casing portion and serving to enclose the depending portion of the core and element disposed thereon, and a hollow handle attached to the first named casing portion and providing a passage for wiring connections to the heating element.

7. An electrical heater, including a core of insulating material, a helical resistance heating element strung along the core and having approximately the following analysis: chromium 20%, silicon 2%, cobalt 2%, carbon under .5%, and the principal part of the remainder iron, and a perforated casing enclosing said core.

8. An electrical water heater, including a core of insulating material, and a rust resisting heating element adapted to generate heat when transmitting electric current and coiled upon the core so that when said element is submerged in water, the latter will be heated by conduction from the element and by virtue of the resistance of the water to the passage of current between the convolutions of the heating element and through the water, when a current is impressed upon the element of a capacity greater than the normal carrying capacity of the element.

In testimony that I claim the foregoing, I have signed my name hereto.

PERCY A. E. ARMSTRONG.

Certificate of Correction.

It is hereby certified that in Letters Patent No. 1,437,481, granted December 5, 1922, upon the application of Percy A. E. Armstrong, of Loudonville, New York, for an improvement in "Immersion Water Heaters," an error appears in the printed specification requiring correction as follows: Page 1, line 26, for "3%" read .3%; and that the said Letters Patent should be read with this correction therein that the same may conform to the record of the case in the Patent Office.

Signed and sealed this 13th day of February, A. D., 1923.

[SEAL.]

KARL FENNING,
*Acting Commissioner of Patents.*